US012618321B2

(12) United States Patent
Li et al.

(10) Patent No.: US 12,618,321 B2
(45) Date of Patent: May 5, 2026

(54) CALIBRATION METHOD FOR LOGGING-WHILE-DRILLING DEVICE

(71) Applicant: Institute of Geology and Geophysics, Chinese Academy of Sciences, Beijing (CN)

(72) Inventors: Xinghan Li, Beijing (CN); Wenxiu Zhang, Beijing (CN); Wenxuan Chen, Beijing (CN); Jian Zheng, Beijing (CN); Wenqiang Yuan, Beijing (CN); Yali Zhang, Beijing (CN); Hong Li, Beijing (CN)

(73) Assignee: Institute of Geology and Geophysics, Chinese Academy of Sciences, Beijing (CN)

( * ) Notice: Subject to any disclaimer, the term of this patent is extended or adjusted under 35 U.S.C. 154(b) by 10 days.

(21) Appl. No.: 18/033,496

(22) PCT Filed: Feb. 8, 2023

(86) PCT No.: PCT/CN2023/075075
§ 371 (c)(1),
(2) Date: Apr. 24, 2023

(87) PCT Pub. No.: WO2023/231444
PCT Pub. Date: Dec. 7, 2023

(65) Prior Publication Data
US 2025/0101864 A1 Mar. 27, 2025

(30) Foreign Application Priority Data
Jun. 1, 2022 (CN) .......................... 202210621327.5

(51) Int. Cl.
*E21B 47/12* (2012.01)
*G01H 3/00* (2006.01)
(Continued)

(52) U.S. Cl.
CPC .............. *E21B 47/12* (2013.01); *G01V 1/307* (2013.01); *G01V 1/40* (2013.01); *G01H 3/005* (2013.01); *G01V 13/00* (2013.01)

(58) Field of Classification Search
CPC ........ E21B 47/12; G01V 13/00; G01V 1/307; G01V 1/40; G01H 3/005
See application file for complete search history.

(56) References Cited

U.S. PATENT DOCUMENTS 5,001,675 A 3/1991 Woodward
5,469,062 A 11/1995 Meyer, Jr.
(Continued)

FOREIGN PATENT DOCUMENTS

CN 1648691 A 8/2005
CN 104234696 A 12/2014
(Continued)

OTHER PUBLICATIONS

International Search Report of PCT/CN2023/075075.
Written Opinion of PCT/CN2023/075075.

*Primary Examiner* — Lisa M Caputo
*Assistant Examiner* — Christian T Bryant

(57) ABSTRACT
The present application discloses a calibration method for a logging-while-drilling device, which is used for measuring data on the sea level and comprises the following steps: horizontally suspending the logging-while-drilling device; measuring amplitudes and phases at different heights; horizontally rotating the logging-while-drilling device for multiple times, and measuring amplitudes and phases at different heights after each horizontal rotation; and when the sum of angles of the multiple horizontal rotations is greater than 360 degrees, calculating an azimuth correction factor according to the measured amplitudes and phases. As the calibration method for the logging-while-drilling device according to the present application is carried out on a wide seawater
(Continued)

interface, the influence of the boundary effect can be eliminated; the uniform medium attributes of air and seawater can be simplified into a one-dimensional double-layer medium model.

4 Claims, 8 Drawing Sheets

(51) Int. Cl.
  *G01V 1/30*        (2006.01)
  *G01V 1/40*        (2006.01)
  *G01V 13/00*       (2006.01)

(56)                References Cited

U.S. PATENT DOCUMENTS

| | | | | |
|---|---|---|---|---|
| 2007/0115000 | A1* | 5/2007 | Merchant | G01V 3/28 |
| | | | | 324/330 |
| 2019/0086439 | A1 | 3/2019 | Zhang et al. | |

| | | | | |
|---|---|---|---|---|
| 2019/0331830 | A1* | 10/2019 | Li | G01V 3/28 |
| 2020/0408950 | A1 | 12/2020 | Pan et al. | |
| 2021/0332690 | A1 | 10/2021 | Stishenko et al. | |
| 2023/0296802 | A1* | 9/2023 | Fan | G01V 1/52 |
| | | | | 367/13 |

FOREIGN PATENT DOCUMENTS

| | | | |
|---|---|---|---|
| CN | 205404034 | A | 7/2016 |
| CN | 205404034 | U | 7/2016 |
| CN | 106869907 | A | 6/2017 |
| CN | 107461191 | A | 12/2017 |
| CN | 109025969 | A | 12/2018 |
| CN | 110145301 | A | 8/2019 |
| CN | 113006777 | A | 6/2021 |
| CN | 115016034 | A | 9/2022 |
| WO | 2020101709 | A1 | 5/2020 |
| WO | 2021227011 | A1 | 11/2021 |

* cited by examiner

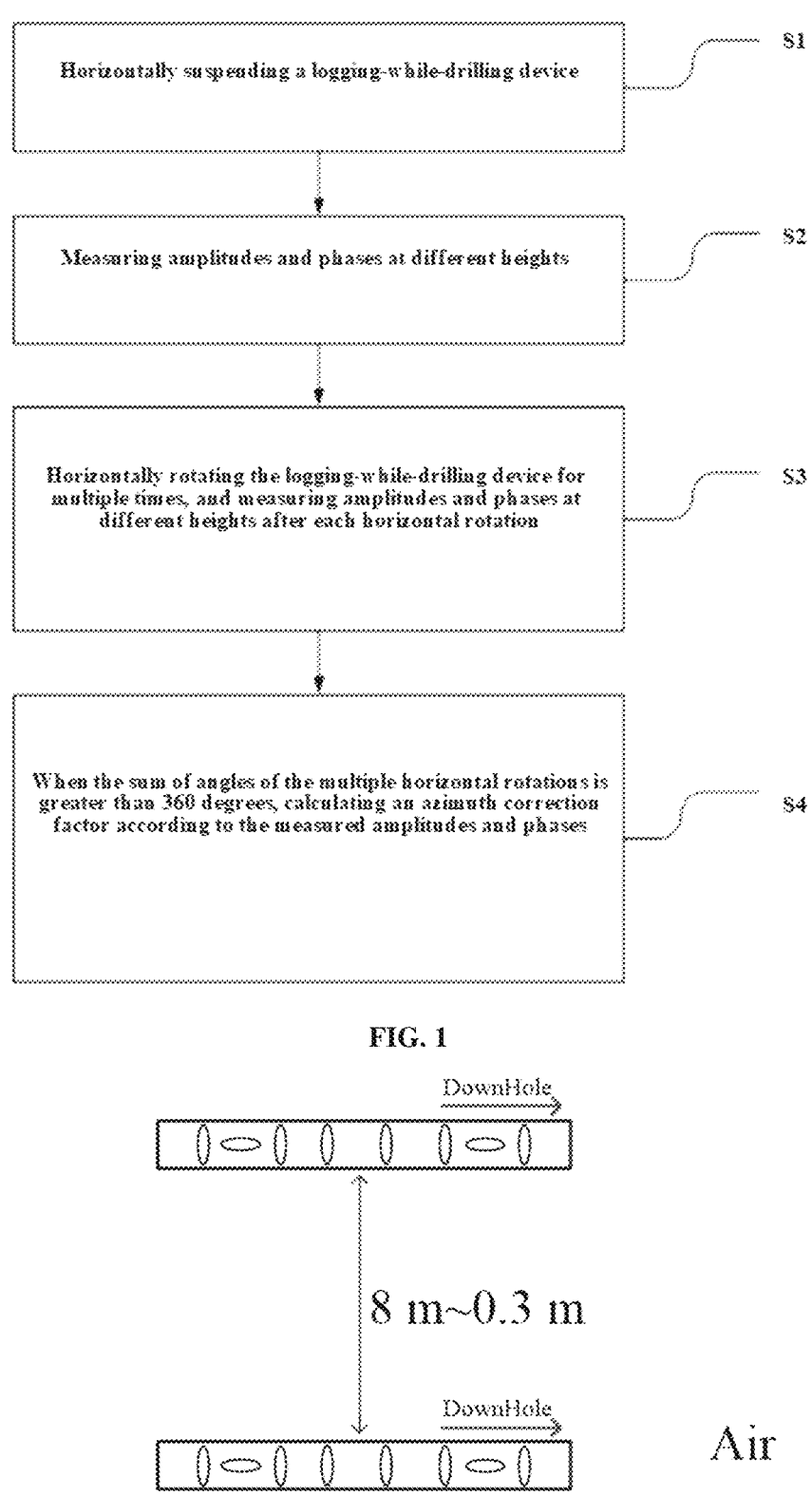

Horizontally suspending a logging-while-drilling device — S1

Measuring amplitudes and phases at different heights — S2

Horizontally rotating the logging-while-drilling device for multiple times, and measuring amplitudes and phases at different heights after each horizontal rotation — S3

When the sum of angles of the multiple horizontal rotations is greater than 360 degrees, calculating an azimuth correction factor according to the measured amplitudes and phases — S4

FIG. 1

DownHole 8 m~0.3 m

DownHole     Air

Seawater

FIG. 2

CALIBRATION METHOD FOR LOGGING-WHILE-DRILLING DEVICE

CROSS-REFERENCE TO RELATED APPLICATIONS

This application is a bypass continuation application of PCT application no.: PCT/CN2019/097583. This application claims priorities from PCT Application PCT/CN2019/097583, filed Jul. 24, 2019, and from Chinese patent application 202210621327.5, filed on Jun. 1, 2022, the contents of which are incorporated herein in the entirety by reference.

TECHNICAL FIELD

The present disclosure relates to the field of structure detection technologies, and in particular, to a calibration method for a logging-while-drilling device.

BACKGROUND ART

An azimuthal electromagnetic wave resistivity logging-while-drilling tool possesses a capability of detecting the stratigraphic boundary by adding inclined or horizontal antennas. The stratigraphic information at different depths can be detected in combination with characteristics of multiple frequencies and multiple receiver-to-transmitter spaces (Wang, 2007). Currently. Schlumberger achieves azimuth detection by using a remote inclined antenna for receiving, with the signal transmission frequencies being 2 MHz, 400 KHz and 100 kHz (Li et al., 2005; Omeragic et al., 2005); Halliburton achieves azimuth detection by three inclined receiver coils, with the signal transmission frequencies being 2 MHZ, 500k Hz and 125 kHz (Bittar et al., 2009); and Baker Hughes achieves azimuth detection by a set of horizontal antennas, with the signal transmission frequencies being 400 kHz and 2 MHz (Wang, 2006; Meyer et al., 2008). The horizontal antenna structure adopted by Baker Hughes avoids the effect of directly-coupling signals, such that signals received by the azimuth antenna can fully reflect the stratigraphic boundary information.

For traditional methods, the calibration is implemented by a water tank. However, the radius of the water tank is limited, and the calibration with the water tank is affected by the edge effect, which greatly attenuates the azimuth signal. Further, the model is complex, and the measurement environment can hardly be fully recovered, which seriously suppresses the calibration results, causes errors to the azimuth signal, and thus leads to deviations in the final backward modeling results.

SUMMARY

An object of the present disclosure is to provide a calibration method for a logging-while-drilling device to solve the technical problem in the prior art that a calibration method using a water tank has larger errors.

To solve the above problem, the present disclosure provides a calibration method for a logging-while-drilling device, which is used for measuring data on the sea level and includes the following steps: horizontally suspending the logging-while-drilling device; measuring amplitudes and phases at different heights; horizontally rotating the logging-while-drilling device for multiple times, and measuring amplitudes and phases at different heights after each horizontal rotation; and when the sum of angles of the multiple horizontal rotations is greater than 360 degrees, calculating an azimuth correction factor according to the measured amplitudes and phases.

As the calibration method for the logging-while-drilling device according to the present disclosure is carried out on a wide seawater interface, the influence of the boundary effect can be eliminated; the uniform medium attributes of air and seawater can be simplified into a one-dimensional double-layer medium model, and meanwhile, the air-seawater environment ensures the consistency between a forward modeling model and an actual measurement environment; and the high air-seawater conductivity contrast can enhance the azimuth signal intensity. In addition, through multi-angle measurement at different heights, the calibration accuracy can be greatly improved.

BRIEF DESCRIPTION OF THE DRAWINGS

One or more embodiments are exemplarily described by a figure in the corresponding accompanying drawings. Unless otherwise specified, the figures in the accompanying drawings do not constitute a scale limitation.

FIG. 1 is a flowchart for a calibration method for a logging-while-drilling device according to an embodiment of the present disclosure;

FIG. 2 is a calibration state diagram for a calibration method for a logging-while-drilling device according to an embodiment of the present disclosure;

In FIG. 2.
dashed lines indicate the sea level.
In FIG. 3,
T1 refers to a first transmitter;
T2 refers to a second transmitter;
T3 refers to a third transmitter;
T4 refers to a fourth transmitter;
R3 refers to a first receiver;
R4 refers to a second receiver; and
Downhole refers to a direction in which the logging-while-drilling device reaches into the ground during the measurement.

DETAILED DESCRIPTION

Figure 3:
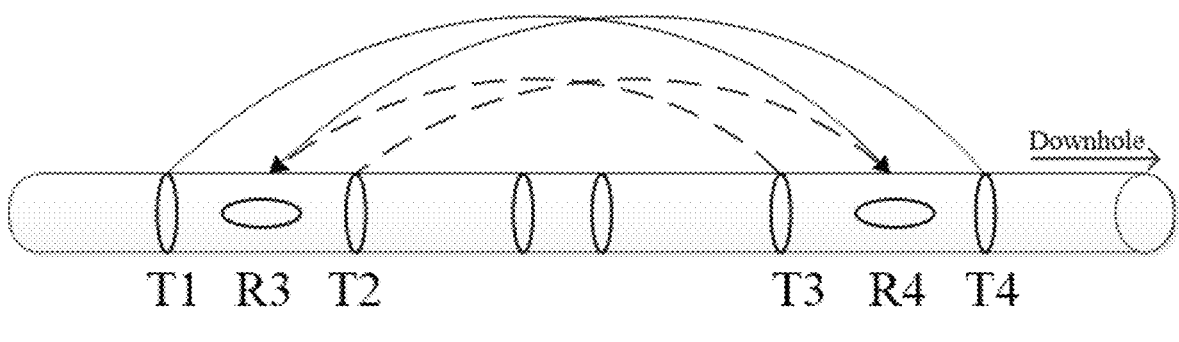
FIG. 3 is a schematic diagram for a logging-while-drilling device according to an embodiment of the present disclosure.

In order to make the objects, technical solutions, and advantages of the present disclosure clearer, the present disclosure is described in further detail below with reference to specific embodiments and the accompanying drawings. It should be understood that the description is merely exemplary and is not intended to limit the scope of the present disclosure. Moreover, in the following description, the description of well-known structures and techniques is omitted to avoid unnecessarily confusing the concept of the present disclosure.

Schematic structural diagrams of the layers according to embodiments of the present disclosure are shown in the accompanying drawings. These drawings are not drawn to scale, and some details may be magnified while some details may be omitted for the purpose of clarity. Various regions, shapes of the layers, and the relative sizes and position relationships therebetween shown in the drawings are only illustrative. In practice, there may be deviations due to manufacturing tolerances or technical limitations. Moreover, those skilled in the art can design regions/layers of different shapes, sizes and relative positions additionally according to actual needs.

Obviously, the embodiments described are some but not all embodiments of the present disclosure. Based on the embodiments of the present disclosure, all other embodiments derived by a person of ordinary skill in the art without creative efforts shall fall within protection scope of the present disclosure.

In addition, the technical features involved in the different implementations of the present disclosure described below may be combined with one another as long as they do not conflict with one another.

The present disclosure will be described in more detail below with reference to the accompanying drawings. The same components are denoted by similar reference signs in the respective accompanying drawings. For the sake of clarity, various parts in the accompanying drawings are not drawn to scale.

As shown in FIG. 1, one embodiment of the present disclosure provides a calibration method for a logging-while-drilling device, which is used for measuring data on the sea level and may include the following steps: horizontally suspending the logging-while-drilling device; measuring amplitudes and phases at different heights; horizontally rotating the logging-while-drilling device for multiple times, and measuring amplitudes and phases at different heights after each horizontal rotation; and when the sum of angles of the multiple horizontal rotations is greater than 360 degrees, calculating an azimuth correction factor according to the measured amplitudes and phases.

As the calibration method for the logging-while-drilling device according to the present disclosure is carried out on a wide seawater interface, the influence of the boundary effect can be eliminated; the uniform medium attributes of air and seawater can be simplified into a one-dimensional double-layer medium model, and meanwhile, the air-seawater environment ensures the consistency between a forward modeling model and an actual measurement environment; and the high air-seawater conductivity contrast can enhance the azimuth signal intensity. In addition, through multi-angle measurement at different heights, the calibration accuracy can be greatly improved. An accurate azimuth correction factor can be acquired through the calibration method for the logging-while-drilling device according to the present disclosure, and the logging-while-drilling device can be corrected based on the accurate azimuth correction factor.

FIG. 2 is a calibration state diagram for a calibration method for a logging-while-drilling device according to an embodiment of the present disclosure.

As shown in FIG. 2, in some embodiments, said measuring amplitudes and phases at different heights may comprise: at heights of 8-1.5 meters above the sea level, measuring an amplitude and a phase for one time for every 0.5 meter to acquire a first measurement result.

In some embodiments, at heights of 1.5-0.3 meter/meters above the sea level, an amplitude and a phase are measured for one time for every 0.3 meter to acquire a second measurement result.

In some embodiments, the first measurement result and the second measurement result are first data.

FIG. 3 is a schematic diagram for a logging-while-drilling device according to an embodiment of the present disclosure.

As shown in FIG. 3, in some embodiments, the logging-while-drilling device may include a first transmitter, a second transmitter, a third transmitter and a fourth transmitter. The first, second, third and fourth transmitters are arranged sequentially along an into-the-well direction of the logging-while-drilling device.

In some embodiments, the logging-while-drilling device may include a first receiver and a second receiver. The first receiver is arranged between the first transmitter and the second transmitter and configured to receive signals emitted by the third transmitter and the fourth transmitter; and the second receiver is arranged between the third transmitter and the fourth transmitter and configured to receive signals emitted by the first transmitter and the second transmitter.

In some embodiments, said measuring amplitudes and phases at different heights may further include: sequentially measuring the signals emitted by the first transmitter, the fourth transmitter, the second transmitter and the third transmitter.

In some embodiments, the first, second, third and fourth transmitters send signals of 0.4 MHz and signals of 2 MHz, which are to be received by the first receiver and the second receiver, respectively.

Figure 4:
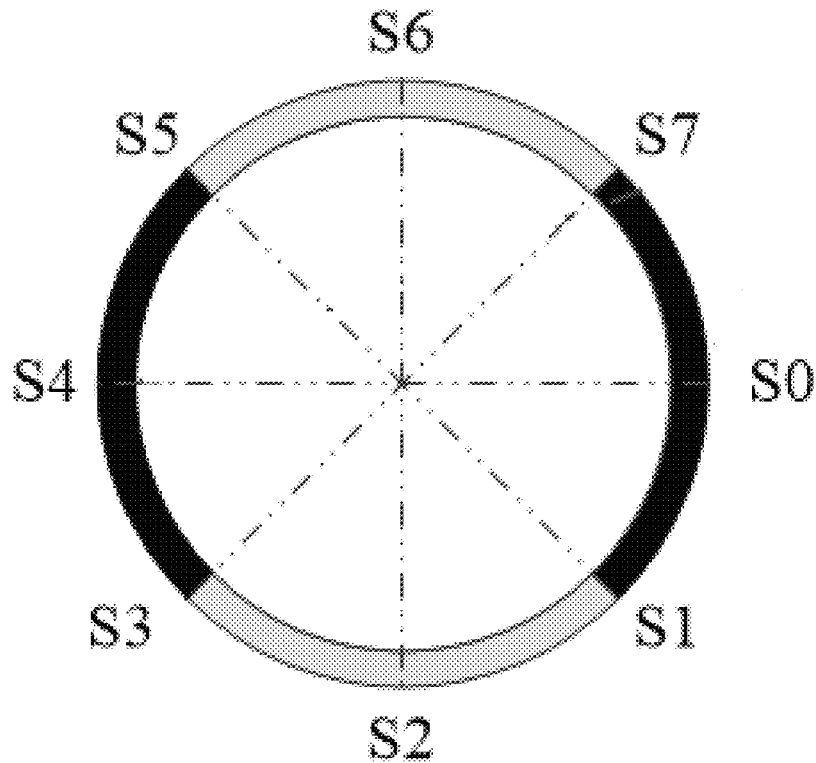
FIG. 4 is a schematic diagram for a logging-while-drilling device according to another embodiment of the present disclosure.

FIG. 4 is a schematic diagram for a logging-while-drilling device according to another embodiment of the present disclosure.

As shown in FIG. 4, in some embodiments, the angle of the horizontal rotation is 45 degrees.

When horizontal rotation is carried out, the dashed line S0 rotates to the position of S1, the dashed line S1 rotates to the position of S2, the dashed line S2 rotates to the position of S3, the dashed line S3 rotates to the position of S4, the dashed line S4 rotates to the position of S5, the dashed line S5 rotates to the position of S6, the dashed line S6 rotates to the position of S7, the dashed line S7 rotates to the position of S0, and so on, with the angle of rotation of 45 degrees every time.

In some embodiments, four sets of data are measured at each height.

In some embodiments, said calculating the azimuth correction factor according to the measured amplitudes and phases includes: converting multiple sets of the first data into a real part and an imaginary part; and calculating a phase shift factor and an amplitude reduction factor from the real and imaginary parts.

Figure 5A:
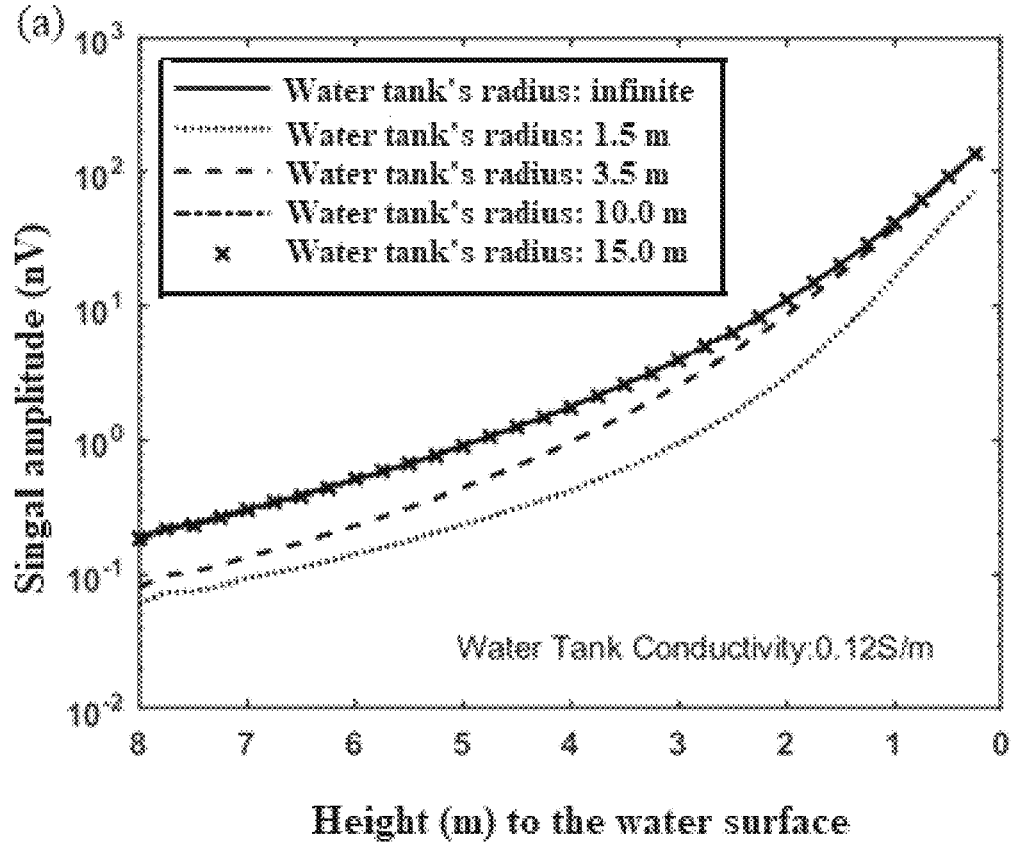
FIGS. 5A-5B are signal trend diagrams for water tanks with different radiuses in a calibration method for a logging-while-drilling device according to the prior art.
Figure 5B:
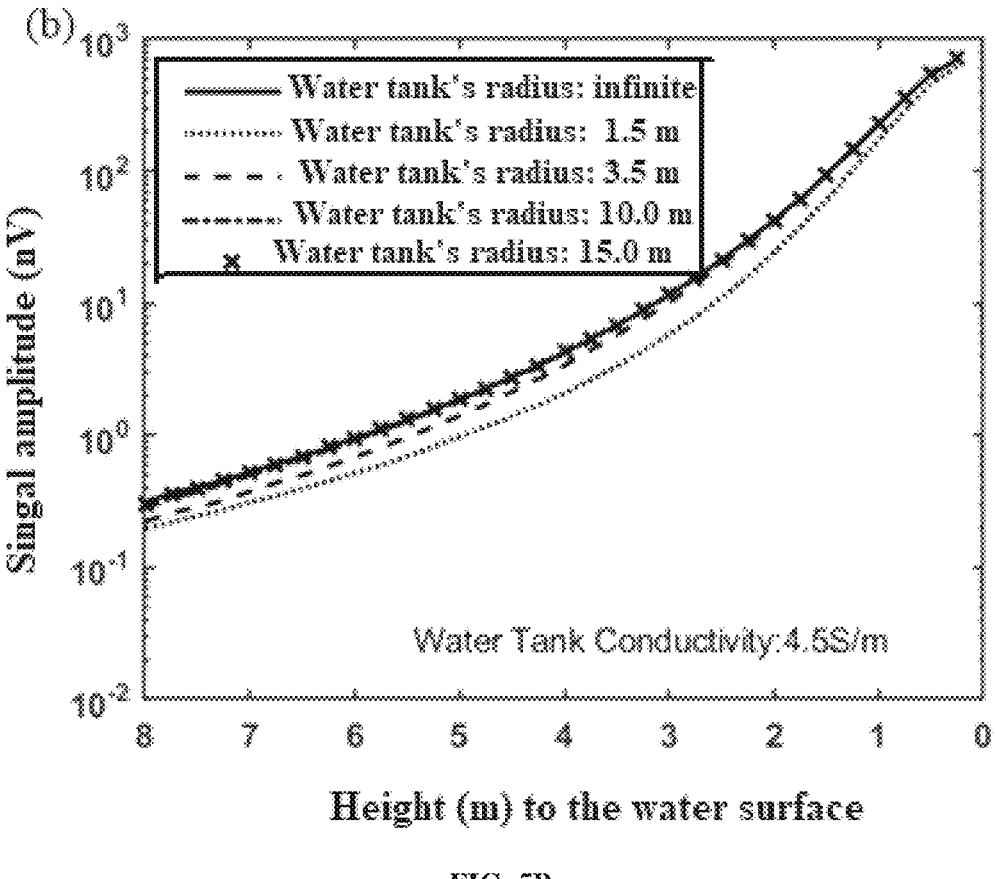

FIGS. 5A-5B are signal trend diagrams for water tanks with different radiuses in a calibration method for a logging-while-drilling device according to the prior art.

FIG. 5A shows simulation results when the conductivity of a water tank is 0.12 S/m; and FIG. 5B shows simulation results when the conductivity of the water tank is 4.5 S/m.

As shown in FIGS. 5A-5B, an azimuth signal varies with the change of the radius of the water tank. Due to the influence of the boundary effect, when the radius of the water tank is less than 15 m, the azimuth signal response is lower than that in two layers of homogeneous isotropic media; and the influence of the boundary effect of the water tank can be eliminated when the radius of the water tank is greater than 15 m. Comparing FIG. 5A and FIG. 5B, it can be seen that the azimuth signal intensity is enhanced with an increase in solution conductivity, which increases the signalto-noise ratio and enhances the accuracy of correction coefficients of the azimuth signal.

It is rather hard to establish a high-conductivity environment for a water tank having a radius of more than 15 m. The actual environment around the water tank also has an impact on the azimuth signal. The three-dimensional (3D) forward modeling model cannot fully recover the actual environment, causing deviations to the azimuth correction coefficient. For limitations in the calibration using the water tank and the ideal environment of the sea level, the present disclosure purposes an instrument calibration method based on a reflective surface of an air-seawater double-layer medium.

In the present disclosure, an air-seawater port environment is selected as the calibration site, and the port has two obvious advantages. First, the contrast between the seawater conductivity (about 4.5 S/m) and the air conductivity (about $10^{-6}$ S/m) is high, and the high azimuth signal response can reduce the influence of environmental noises, thereby acquiring an accurate azimuth correction factor. Second, the water at the port is rather deep, and the port environment is consistent with the air-seawater model environment, which simplifies the forward modeling model and reduces uncertainties.

FIGS. 6A-6D are signal trend diagrams of a calibration method for a logging-while-drilling device according to another embodiment of the present disclosure.

Figure 6A:
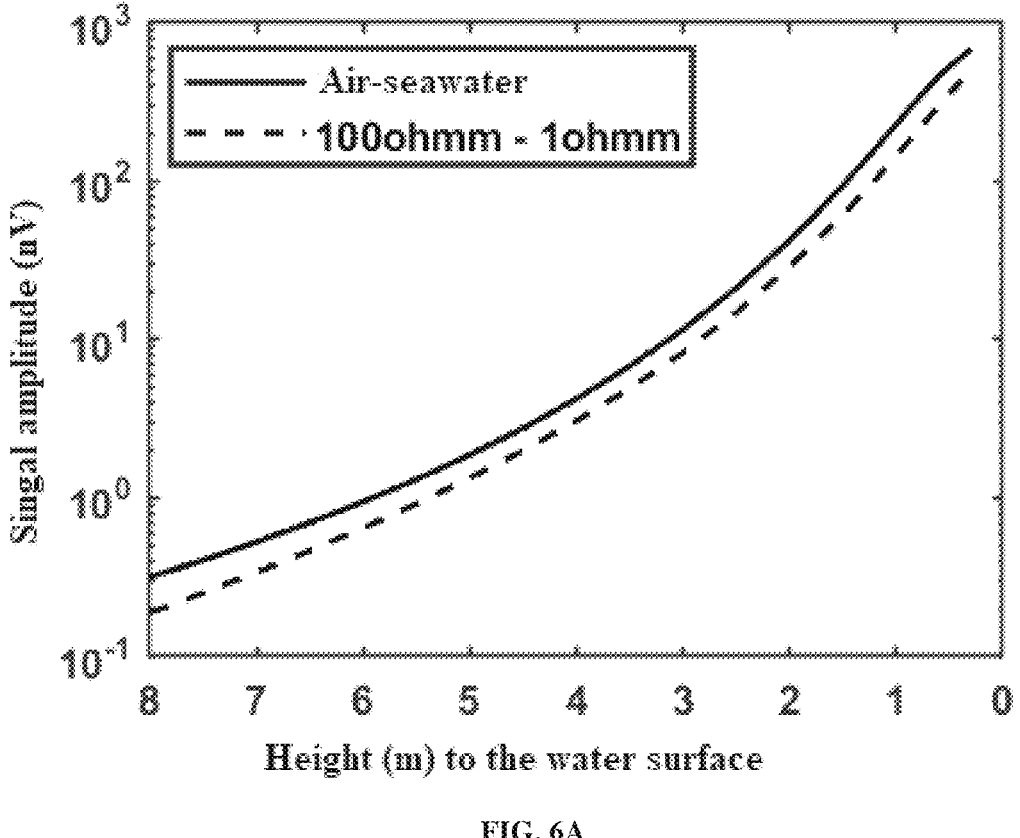
FIGS. 6A-6D are signal trend diagrams of a calibration method for a logging-while-drilling device according to another embodiment of the present disclosure.
Figure 6B:
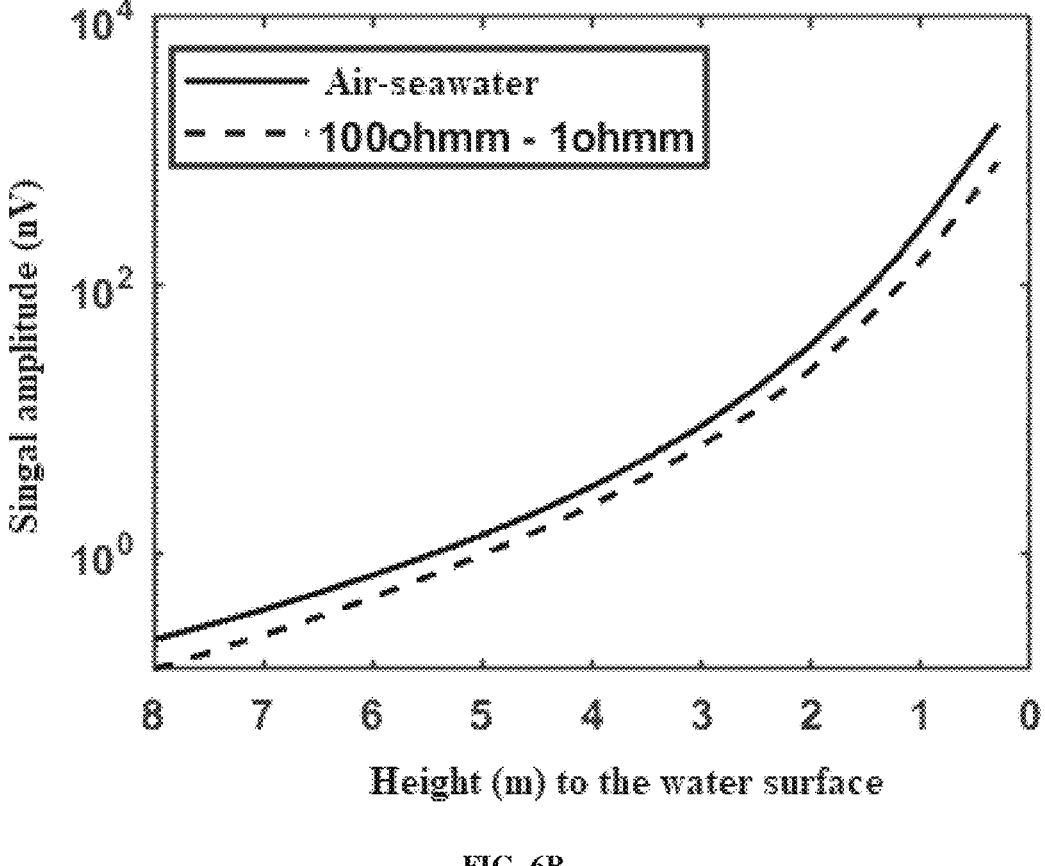
Figure 6C:
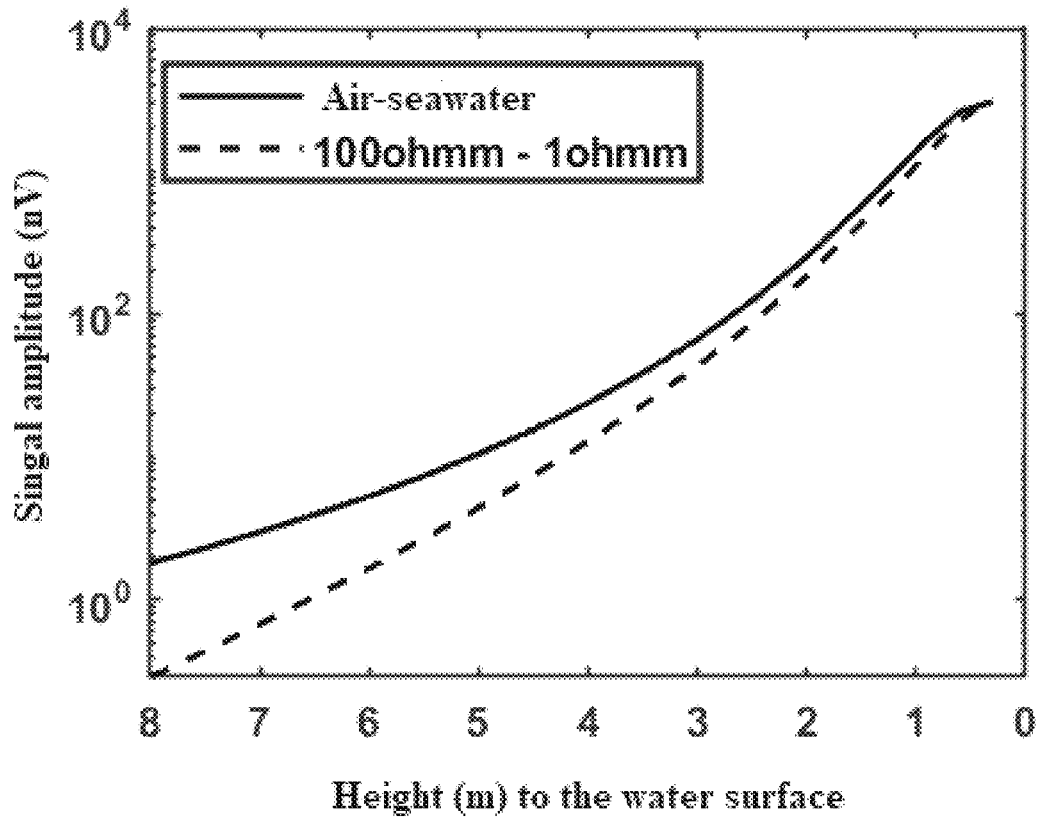
Figure 6D:
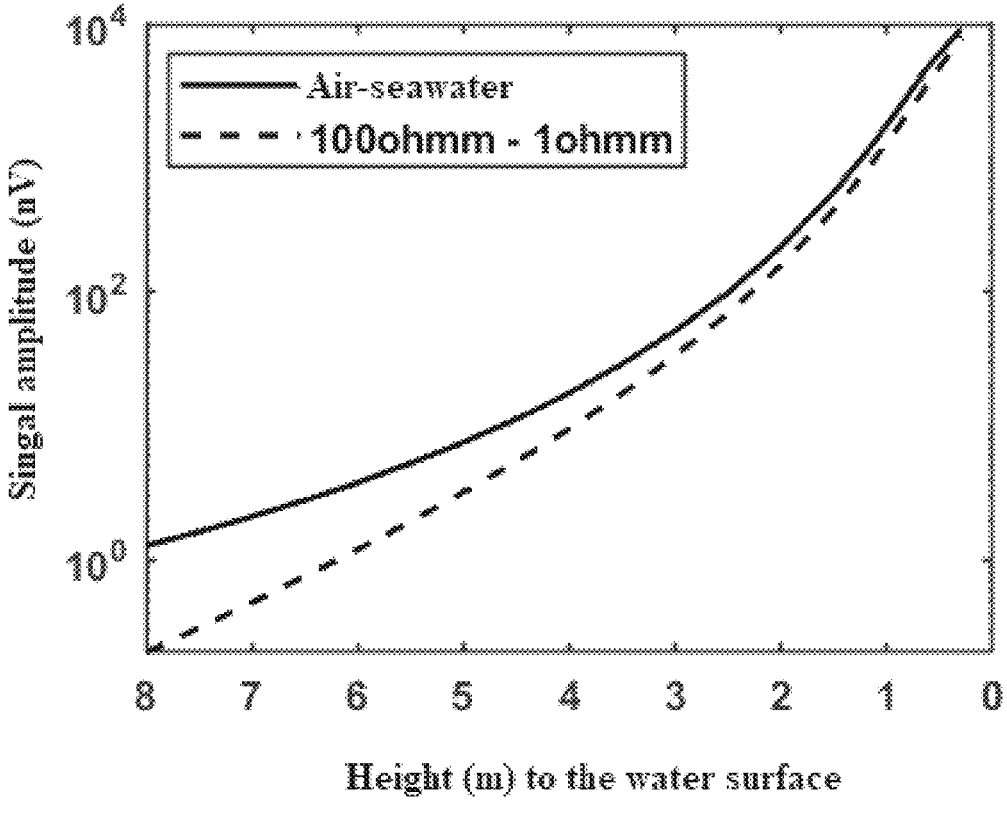

As shown in FIGS. 6A-6D, the solid line shows the azimuth signal changing with the height of the instrument to the water surface under an air-seawater model; and the dashed line shows the azimuth signal changing with the height of the instrument to the water surface under a 100–1 Ω·m model. FIG. 6A shows signal response curves of a 400 kHz long space under the two models; FIG. 6B shows signal response curves of a 400 kHz short space under the two models; FIG. 6C shows signal response curves of a 2 MHz long space under the two models; and FIG. 6D shows signal response curves of a 2 MHz short space under the two models.

It can be seen from FIGS. 6A-6D that the response curves have different trends under the two models. Thus, the maximum boundary detection capabilities under the different models are different. In general, the technical specification of the instrument is defined as the detection capability of the instrument under 100–1 Ωm·model. By comparing response values under the two models shown in FIGS. 6A-6D, the detection capability under the air-seawater model can be converted to that under the 100–1 Ω·m model, and then the detection capability under the 100–1 Ω·m model is compared with the technical specification to verify the technical specification of the instrument.

For example, the azimuth signal of the 400 kHz long space under the air-seawater model has a maximum boundary detection distance of 7 m, and the signal amplitude in the channel may be acquired under the air-seawater model; then, the signal amplitude maps to that under an environment of 100 Ω·m–1 Ω·m, and the height to the water surface corresponding to the amplitude is the maximum boundary detection depth under the model.

In some embodiments, said calculating the azimuth correction factor may include following steps.

Firstly, the data are recorded as an amplitude and a phase; the amplitude and phase are converted to real and imaginary parts by R+iI=Amp×e^{iPha}, where R is the converted real part, I is the converted imaginary part, Amp is the measured amplitude, and Pha is the measured phase.

Secondly, measurement signals for 8 azimuths are acquired at each depth, and the real and imaginary parts of the 8 signals should be in the form of sine and cosine functions. Due to the deviation caused by circuit noises and other factors, the real and imaginary parts at each depth are fitted to the sine and cosine form by curve fitting.

Thirdly, a base value of the fitted curve is not zero due to the presence of local noise, and the base value is subtracted from the fitted curve to eliminate the local noise.

Finally, an amplitude correction factor and a phase correction factor are acquired by comparing the simulation results with the processed measurement signals, and the calculation equations are shown as equations (1) and (2):

$$\varphi = \arctan\left(\frac{Im}{Re}\right), \qquad \text{Equation (1)}$$

$$A = \sqrt{Re^2 + Im^2}, \qquad \text{Equation (2)}$$

where $$Re = \frac{R^* R_c + I^* I_c}{R_c^2 + I_c^2},$$

$$Im = \frac{I^* R_c - R^* I_c}{R_c^2 + I_c^2}$$

and R* refers to the real part as acquired from the simulation; I* refers to the imaginary part as acquired from the simulation; $R_c$ refers to the corrected real part; $I_c$ refers to the corrected imaginary part; φ refers to the phase shift factor of the 400 kHz signal as emitted by T1 and received by R4; and A refers to the amplitude reduction factor of the 400 kHz signal as emitted by T1 and received by R4. The signal processing manners for other frequencies and receiver-to-transmitter spaces are the same, and 8 groups of azimuth signal correction factors are acquired.

In general, the detection capability of the instrument refers to the capability of the instrument of detecting the stratum 1Ω·m in the stratum 100Ω·m. The detection depth under the air-seawater model is converted to the detection depth under model 100Ω·m–1Ω·m. The signal intensity under the air-seawater model and under the model 100Ω·m–1Ω·m is shown in FIGS. 6A-6D. The detection capability under the air-seawater model can be converted to that under the model 100Ω·m–1Ω·m by comparison and conversion.

The present disclosure intends to protect a calibration method for a logging-while-drilling device, which is used for measuring data on the sea level and may include the following steps: horizontally suspending the logging-while-drilling device; measuring amplitudes and phases at different heights; horizontally rotating the logging-while-drilling device for multiple times, and measuring amplitudes and phases at different heights after each horizontal rotation; and when the sum of the angles of the multiple horizontal rotations is greater than 360 degrees, calculating an azimuth correction factor according to the measured amplitudes and phases. As the calibration method for the logging-while-drilling device according to the present disclosure is carried out on a wide seawater interface, the influence of the boundary effect can be eliminated; the uniform medium attributes of air and seawater can be simplified into a one-dimensional double-layer medium model, and meanwhile, the air-seawater environment ensures the consistency between a forward modeling model and an actual measurement environment; and the high air-seawater conductivity contrast can enhance the azimuth signal intensity. In addition, through multi-angle measurement at different heights, the calibration accuracy can be greatly improved.

It should be understood that the above specific embodiments of the present disclosure are only for exemplary illustration or explanation of the principles of the present disclosure, and do not constitute a limitation to the present disclosure. Therefore, any modification, equivalent replacement, improvement, and the like as made without deviating from the spirit and scope of the present disclosure shall be regarded as within the protection scope of the present disclosure. In addition, the claims appended to the present disclosure are intended to cover all variations and modifications that fall within the scope and boundaries of the appended claims, or the equivalent form of such scope and boundaries.

What is claimed is:

1. A calibration method of a logging while drilling device, wherein measurement data is taken beginning at sea level, and the calibration method comprises:

the logging while drilling device comprises a first transmitter, a second transmitter, a third transmitter, a fourth transmitter, a first receiver and a second receiver;

the first transmitter, the second transmitter, the third transmitter and the fourth transmitter are sequentially arranged on the logging while drilling device in a well-entering direction;

the first receiver is arranged between the first transmitter and the second transmitter, and the first receiver is configured to receive signals transmitted by the third transmitter and the fourth transmitter; the second receiver is arranged between the third transmitter and the fourth transmitter, and the second receiver is configured to receive signals transmitted by the first transmitter and the second transmitter; and suspending the logging while drilling device horizontally; and the logging while drilling device measures amplitudes and phases at different heights;

the amplitudes and phases measured comprise: sequentially measuring the amplitudes and phases of signals transmitted by the first emitter, the fourth emitter, the second emitter and the third emitter by using the logging while drilling;

the logging while drilling device measures both in the initial floating position and after being rotated position;

rotating the logging while drilling device multiple times horizontally, and measuring amplitudes and phases at different heights after each horizontal rotation; when the sum of the angles of multiple horizontal rotations is greater than 360 degrees, and a azimuth correction factor is calculated according to the amplitudes and phases; and the amplitudes and phases measured at different heights comprise: the amplitudes and phases measured once every 0.5 m between 1.5 and 8 m above sea level to obtain first measurement results; the amplitudes and phases measured once every 0.3 m between 0.3 and 1.5 m above sea level to obtain second measurement results; the first measurement results and the second measurement results are first data; a plurality of the first data are converted into real parts and imaginary parts, and a phase shift factor and an amplitude reduction factor are calculated through the real parts and the imaginary parts.

2. The calibration method according to claim 1, wherein the first transmitter, the second transmitter, the third transmitter and the fourth transmitter transmit signals of 0.4 MHz for the first receiver and 2 MHz for the second receiver to receive signals.

3. The calibration method according to claim 1, wherein the angle of horizontal rotation is 45 degrees.

4. The calibration method according to claim 1, wherein four sets of data are measured for each height.

* * * * *